(No Model.)

J. F. J. GUNNING.
CORSET.

No. 452,968. Patented May 26, 1891.

Witnesses
Franklin Moore
J. S. Davis.

Inventor
J. F. J. Gunning
By his Attorney
Geo. C. Robb.

UNITED STATES PATENT OFFICE.

JAMES FERRIS JOSEPH GUNNING, OF TORONTO, ONTARIO, CANADA.

CORSET.

SPECIFICATION forming part of Letters Patent No. 452,968, dated May 26, 1891.

Application filed August 1, 1889. Serial No. 319,480. (No model.) Patented in Canada January 16, 1889, No. 30,573.

*To all whom it may concern:*

Be it known that I, JAMES FERRIS JOSEPH GUNNING, formerly of New Haven, Connecticut, a subject of the Queen of Great Britain, and presently residing at 45 High street, in the city of Toronto, Province of Ontario, in the Dominion of Canada, have invented certain new and useful Improvements in Corsets, (for which I obtained a patent in Canada, No. 30,573, dated January 16, 1889,) of which the following is a specification.

My invention relates to the parts of the corsets which are drawn together by a lacing-cord or fastened together by hooks and eyelets.

The object of my invention is to provide a corset that can be widened without causing an opening in the joint.

The invention consists of constructions and combinations, as will hereinafter be described in the specification, and set forth in the claim, reference being had to the accompanying drawings, in which—

Figure 1:
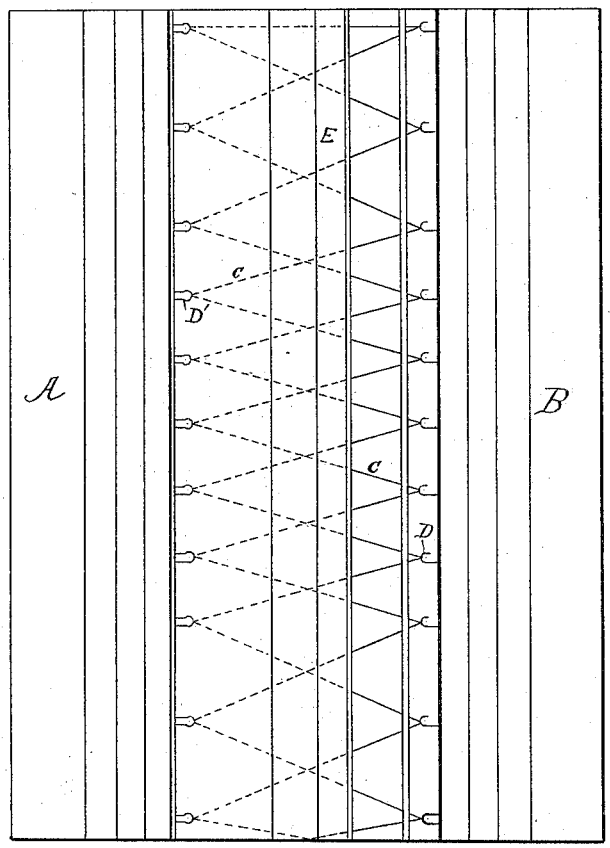
Figure 2:
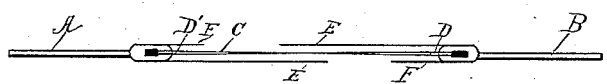

Figure 1 represents an exterior view of a corset back or front made with my improvements, and Fig. 2 a section or end view of the same.

A represents one side, and B the other side, of a corset; C, a lacing-cord, and D D' hooks or eyelets of any well-known form, preferably of continuous wire bent to form hooks or eyelets at such distance apart as may be required, and are secured to the material forming the corset, which material is cut to form openings for the eyelets or hooks to project through, so that the lacing-cords may be attached to them. In this way the hooks and eyes are securely fastened in the corset-body, and the wire forms part of the stiffening material of the corset.

Each side of the corset is made with two lapels or folds of cloth projecting beyond the hooks or eyelets and having the hooks or eyelets between them. One of these lapels is longer than the other, and they are so made that the longer lapel of the one side is opposite the shorter lapel of the other side.

In the drawings, E E are the longer lapels, and F F are the shorter lapels, and D D are the hooks or eyelets.

The object attained by placing the hooks or eyelets between the lapels is that they may be entirely covered by the material of the corset and so prevented from coming in contact with any of the other garments and soiling them. The lapels are made of unequal length and a longer one placed opposite a shorter one that the lacing-cord may be loosened and the corset widened without making an open joint. By my improvement a close joint can be preserved until the edges of the two longer lapels pass each other, whereas with the ordinary corset whenever the lacing-cord is slackened an opening is made between the two sides of the corset, and while all the rest of the circumference of the body is protected the part at the joint is not.

What I claim, and desire to secure by Letters Patent, is—

A corset having the edges which are drawn together by a lacing-cord formed each with a longer lapel and a shorter lapel, and having hooks or eyelets between the lapels on each side of the corset, and having the longer lapel of the one edge opposite the shorter lapel of the other edge, as herein described, and for the purpose specified.

JAMES FERRIS JOSEPH GUNNING.

Witnesses:
GEO. C. ROBB,
A. FRASER.